(12) United States Patent
Kadowaki et al.

(10) Patent No.: US 11,566,754 B2
(45) Date of Patent: Jan. 31, 2023

(54) GAS SUPPLY SYSTEM

(71) Applicant: HONDA MOTOR CO., LTD., Tokyo (JP)

(72) Inventors: Kazuyuki Kadowaki, Wako (JP); Koichi Takaku, Wako (JP); Satoru Kawase, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/329,704

(22) Filed: May 25, 2021

(65) Prior Publication Data

US 2021/0372572 A1 Dec. 2, 2021

(30) Foreign Application Priority Data

May 29, 2020 (JP) .............................. JP2020-093943

(51) Int. Cl.
*F17D 1/04* (2006.01)
*F17D 3/01* (2006.01)
*F17C 13/02* (2006.01)
*F17C 13/00* (2006.01)

(52) U.S. Cl.
CPC .............. *F17D 1/04* (2013.01); *F17C 13/025* (2013.01); *F17D 3/01* (2013.01); *F17C 13/002* (2013.01); *F17C 2205/0338* (2013.01); *F17C 2250/0408* (2013.01); *F17C 2250/0626* (2013.01)

(58) Field of Classification Search
CPC .. F17D 1/04; F17D 3/01; F17C 13/025; F17C 13/002; F17C 2205/0338; F17C 2250/0408; F17C 2250/0626
USPC ......................................................... 137/487.5
See application file for complete search history.

(56) References Cited

FOREIGN PATENT DOCUMENTS

| JP | 2010-003527 A | 1/2010 |
| JP | 2010003527 A | * 1/2010 |

OTHER PUBLICATIONS

JP2010003527A—English Translation (Year: 2010).*

* cited by examiner

*Primary Examiner* — Timothy P. Kelly
*Assistant Examiner* — Christopher M Afful
(74) *Attorney, Agent, or Firm* — Carrier Shende & Associates, P.C.; Joseph P. Carrier; Fulchand P. Shende

(57) ABSTRACT

In a gas supply system of one embodiment, if first detection information of a high-pressure sensor exceeds a first threshold value, a gas control ECU causes a pressure adjustment range to overlap a second error range of second detection information of a mid-pressure sensor, the second error range being defined with a second threshold value as a reference point. If the first detection information is less than or equal to the first threshold value, the gas control ECU offsets the pressure adjustment range relative to the second error range defined with the second threshold value as the reference point.

7 Claims, 7 Drawing Sheets

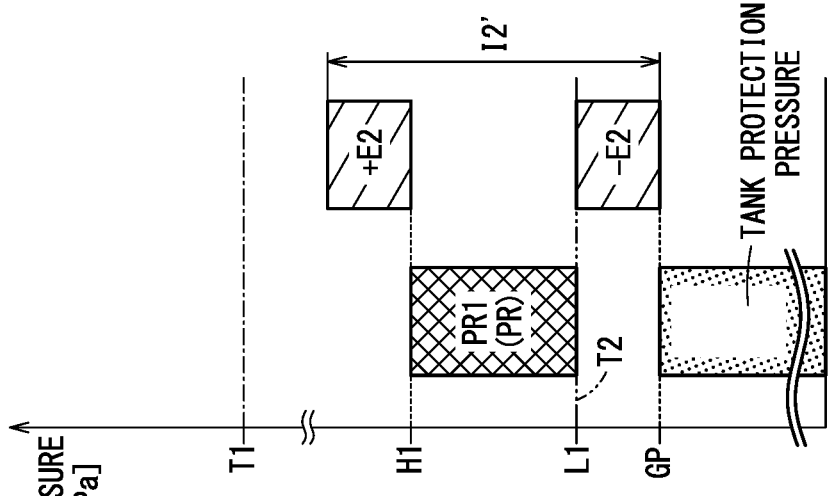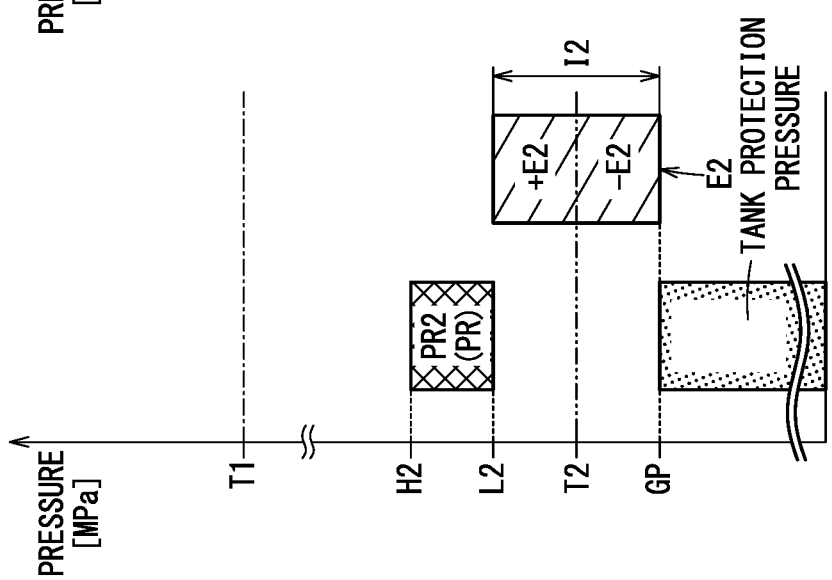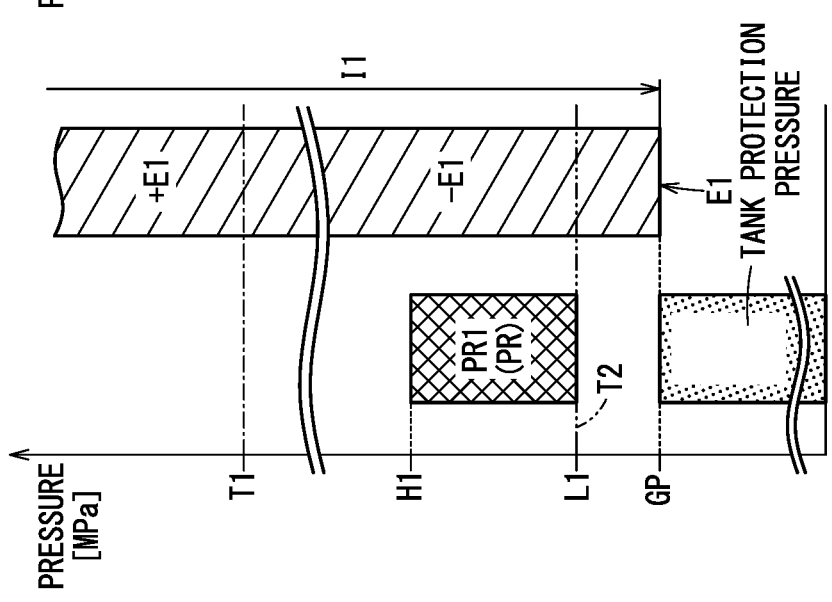

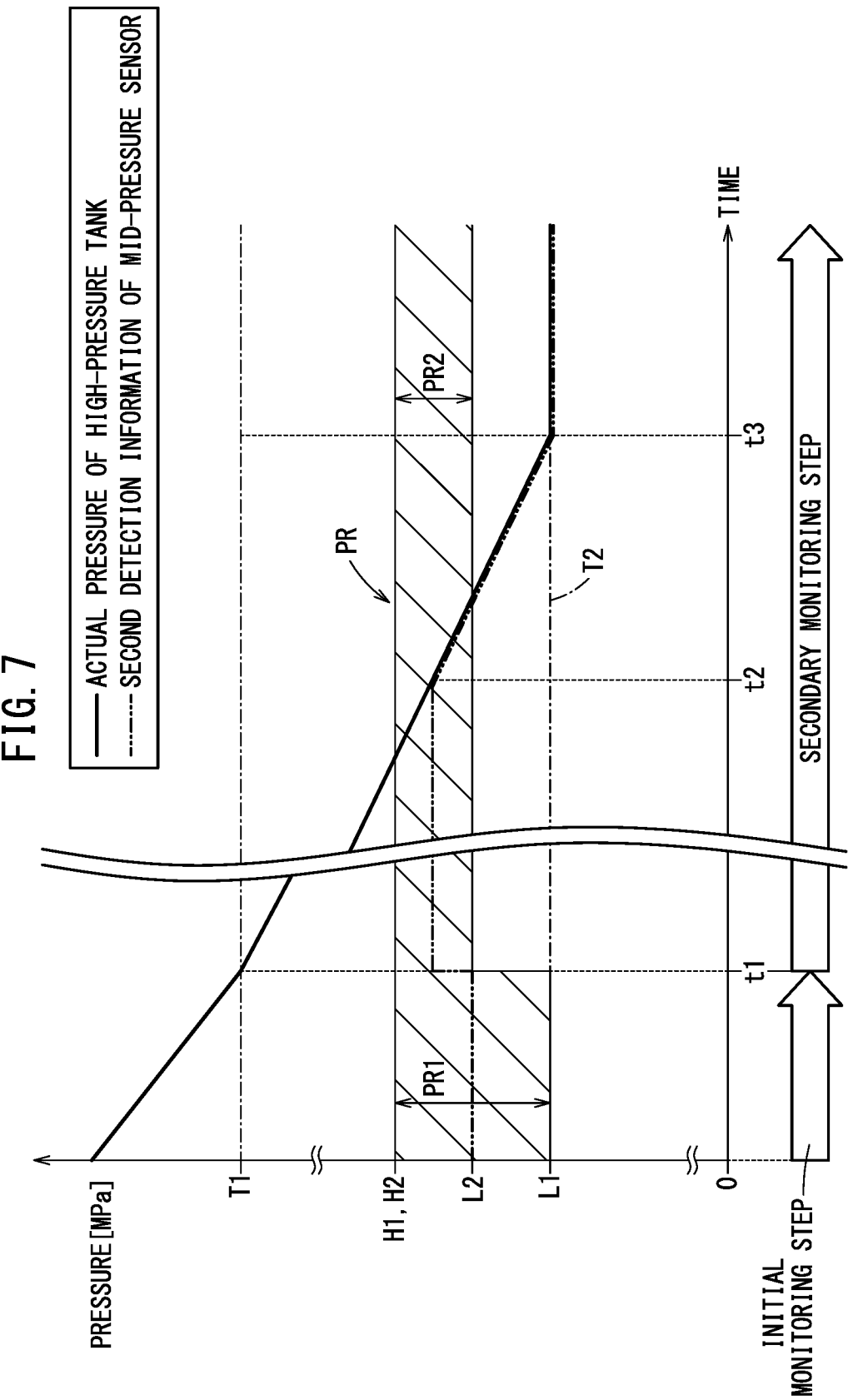

GAS SUPPLY SYSTEM

CROSS-REFERENCE TO RELATED APPLICATION

This application is based upon and claims the benefit of priority from Japanese Patent Application No. 2020-093943 filed on May 29, 2020, the contents of which are incorporated herein by reference.

BACKGROUND OF THE INVENTION

Field of the Invention

The present invention relates to a gas supply system that supplies gas contained inside a high-pressure tank.

Description of the Related Art

A gas supply system is used in a fuel cell system disclosed in JP 2010-003527 A, for example, as an apparatus for supplying fuel gas (hydrogen gas or anode gas: compressible fluid) in a high-pressure tank. The fuel gas in the high-pressure tank is supplied to a fuel cell stack via a gas supply path including a regulator at a midway position therein. The regulator reduces the pressure of the fuel gas on the upstream (high-pressure tank) side and causes this fuel gas to flow to the downstream (fuel cell stack) side.

Furthermore, the system disclosed in JP 2010-003527 A includes a high-pressure sensor (first pressure sensor) that detects the pressure inside the high-pressure tank, and a mid-pressure sensor (second pressure sensor) that detects the pressure on the downstream side of the regulator. The high-pressure sensor has a large error range due to having a wide pressure detection range, while the mid-pressure sensor has a small error range due to having a narrower pressure detection range than the high-pressure sensor. Therefore, when the pressure in the high-pressure tank becomes low, the system determines the pressure of the fuel gas in the high-pressure tank (lack of gas) by switching from monitoring using the high-pressure sensor to monitoring using the mid-pressure sensor.

SUMMARY OF THE INVENTION

The mid-pressure sensor of the gas supply system detects detection information including a pressure adjustment range in the error range, at a stage when the pressure of the fuel gas in the high-pressure tank is within or above the pressure adjustment range of the regulator. Therefore, if a threshold value for the lack of gas in the high-pressure tank is set within the pressure adjustment range of the regulator, the gas supply system experiences a problem that the error becomes large even when the mid-pressure sensor is used, and the monitoring accuracy for the pressure in the high-pressure tank is reduced.

Alternatively, it is conceivable to set the pressure adjustment range of the regulator in advance to be higher than the lack-of-gas threshold value of the mid-pressure sensor, so that the pressure adjustment range is not included in the error range. However, in such a case, it becomes necessary to increase the pressure resistance capabilities of a device on the downstream side of the regulator, and if the pressure resistance capabilities of this device were to be increased, the weight and cost would be increased significantly.

The present invention relates to the technology of the gas supply system described above, and has the object of providing a gas supply system that can accurately determine a lack of gas in the high-pressure tank and promote a reduction in the weight and cost of devices on the downstream side of the regulator.

In order to achieve the aforementioned object, one aspect of the present invention is a gas supply system comprising a high-pressure tank; a regulator configured to reduce pressure of a gas released from the high-pressure tank to be within a pressure adjustment range and cause the gas to flow to a downstream side; a first pressure sensor that has a first error range and is configured to detect the pressure of the gas on an upstream side of the regulator; a second pressure sensor that has a second error range narrower than the first error range and is configured to detect the pressure of the gas on the downstream side of the regulator; a control section configured to process first detection information of the first pressure sensor and second detection information of the second pressure sensor; and a flow state adjusting section configured to change the pressure adjustment range by adjusting a flow state of the gas under control of the control section, wherein the control section has a first threshold value corresponding to the first detection information and a second threshold value corresponding to the second detection information, in order to determine lack of gas in the high-pressure tank, and the control section compares the first detection information to the first threshold value, causes the pressure adjustment range to overlap the second error range defined with the second threshold value as a reference point if the first detection information exceeds the first threshold value, and offsets the pressure adjustment range relative to the second error range defined with the second threshold value as the reference point if the first detection information is less than or equal to the first threshold value.

The gas system described above can accurately determine a lack of gas in the high-pressure tank and promote a reduction in the weight and cost of devices on the downstream side of the regulator.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4A is a graph for describing the pressure adjustment range in an initial monitoring step and a first error range of the high-pressure sensor;

FIG. 4B is a graph for describing the pressure adjustment range in a secondary monitoring step and a second error range of the mid-pressure sensor;

FIG. 4C is a graph for describing the pressure adjustment range in a reference example and the second error range of the mid-pressure sensor;

FIG. 7 is a graph for describing the change of pressure in the high-pressure tank over time and the lack-of-gas determination method.

DESCRIPTION OF THE PREFERRED EMBODIMENTS

Preferred embodiments of the present invention will be presented and described below with reference to the accompanying drawings.

Figure 1:
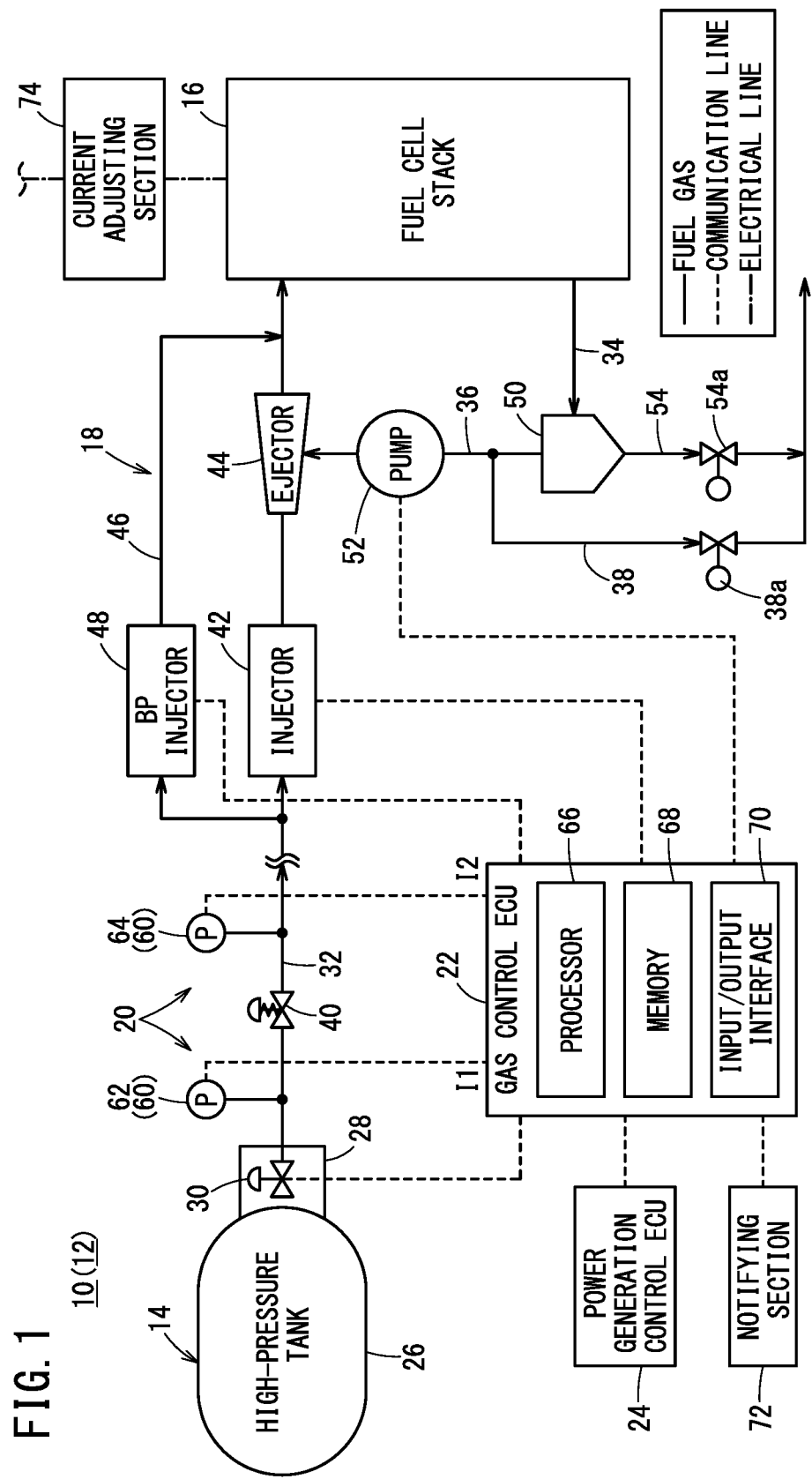
FIG. 1 is a descriptive diagram showing an overall configuration of a gas supply system according to one embodiment of the present invention.

As shown in FIG. 1, a gas supply system 10 according to one embodiment of the present invention is used in a fuel cell system 12, as a fuel gas system apparatus that supplies fuel gas (hydrogen gas or anode gas) that is a compressible fluid. This gas supply system 10 includes a high-pressure tank 14 capable of storing and releasing the fuel gas, and supplies the fuel gas from the high-pressure tank 14 to a fuel cell stack 16. The fuel cell stack 16 generates power by an electrochemical reaction between the fuel gas supplied by the gas supply system 10 and an oxygen-containing gas (air or cathode gas) supplied by an oxygen-containing gas system apparatus (not shown in the drawings).

The fuel cell system 12 is mounted in a fuel cell vehicle (not shown in the drawings), for example, and supplies electrical equipment such as a motor and a battery with the power generated by the fuel cell stack 16. The fuel cell system 12 (gas supply system 10) is not limited to being adopted in a fuel cell vehicle, and may be formed to be stationary, for example.

The gas supply system 10 includes, in addition to the high-pressure tank 14 described above, a gas flow portion 18 that allows the fuel gas to flow between the high-pressure tank 14 and the fuel cell stack 16, and a sensor group 20 provided in the gas flow portion 18. Furthermore, the gas supply system 10 includes a gas control ECU (Electronic Control Unit) 22 that controls various devices for causing the fuel gas to flow in the high-pressure tank 14 and the gas flow portion 18. The gas control ECU 22 controls the flow state of the fuel gas based on a request command for the fuel gas from a power generation control ECU 24 that controls the power generation of the fuel cell system 12. The gas control ECU 22 may be provided integrally with the power generation control ECU 24.

The high-pressure tank 14 includes a container body 26 formed by a liner and a reinforcement layer (CFRP) (not shown in the drawings), for storing the high-pressure fuel gas, and a cap (not shown in the drawings) for releasing the fuel gas from the container body 26 into the gas flow portion 18. A connector 28 for connecting the high-pressure tank 14 and the gas flow portion 18 is attached to the cap. This connector 28 includes a main stop valve 30 that switches between releasing and stopping the release of the fuel gas in the high-pressure tank 14.

The main stop valve 30 opens and closes the flow path inside the connector 28, in response to a control signal output from the gas control ECU 22. The fuel gas in the high-pressure tank 14 is released into the gas flow portion 18 when the main stop valve 30 is in the open state, and the release of the fuel gas is cut off when the main stop valve 30 is in the closed state.

The gas flow portion 18 has a flow path allowing the fuel gas to flow, between the high-pressure tank 14 and the fuel cell stack 16. Specifically, the gas flow portion 18 includes a gas supply path 32 that extends from the high-pressure tank 14 to the fuel cell stack 16 and allows the fuel gas to flow therethrough. Furthermore, the gas flow portion 18 includes a gas discharge path 34 through which fuel off gas (unreacted fuel gas, nitrogen gas, steam, or the like) is discharged from the fuel cell stack 16, and a gas circulation path 36 that causes the fuel off gas in the gas discharge path 34 to circulate back to the gas supply path 32. Yet further, a purge path 38 for discharging the fuel off gas from the circulation route of the gas flow portion 18 is connected to the gas circulation path 36. The purge path 38 is provided with a purge valve 38a that discharges or stops discharging the fuel off gas.

The gas flow portion 18 includes devices for adjusting the flow state (pressure, flow rate, flow velocity, and the like) of the fuel gas, in the gas supply path 32, the gas discharge path 34, and the gas circulation path 36. Specifically, the gas supply path 32 includes a regulator 40, an injector 42, an ejector 44, and the like in the stated order from the upstream side (high-pressure tank 14 side) toward the downstream side (fuel cell stack 16 side). The gas supply path 32 may be provided with a device such as a heat exchanger (not shown in the drawings), in addition to the above devices. Furthermore, the gas supply system 10 may include the main stop valve 30 in, instead of the connector 28, the gas supply path 32 on the upstream side of the regulator 40.

In the gas supply path 32, the high-pressure fuel gas flows into the regulator 40 from the upstream side (primary side: high-pressure tank 14 side), and the regulator 40 depressurizes and emits this fuel gas to the downstream side (secondary side: fuel cell stack 16 side). As an example, the regulator 40 includes a pressure adjustment spring and a valve within a case (none of which are shown in the drawings), and adjusts the pressure of the fuel gas by opening and closing the valve according to the difference between the elastic force of the pressure adjustment spring and the pressure on the downstream side. In FIG. 1, a configuration is shown in which one regulator 40 is provided in the gas supply path 32, but the gas flow portion 18 may be configured to include a plurality of regulators 40 and to reduce the pressure of the fuel gas in a stepped manner toward the downstream side.

The regulator 40 reduces the pressure of the fuel gas to be within a set pressure adjustment range PR (see FIGS. 4A to 4C), and emits the depressurized fuel gas to the gas supply path 32 on the downstream side. As an example, in a normal state where a sufficient amount of the fuel gas is stored in the high-pressure tank 14, the regulator 40 depressurizes the fuel gas such that the pressure thereof is in a first pressure adjustment range PR1 (see FIG. 4A) that has a lower limit value of L1 and an upper limit value of H1. The pressure adjustment range PR of the regulator 40 can also be changed by adjusting the flow rate of the fuel gas. The control of changing the pressure adjustment range PR is described in detail further below.

A valve of the injector 42 is repeatedly opened and closed, under the control of the gas control ECU 22, to suitably adjust the discharge amount of the fuel gas output to the fuel cell stack 16. In other words, the injector 42 corresponds to a flow state adjusting section that adjusts the flow rate (supply amount) of the fuel gas from the high-pressure tank 14 toward the fuel cell stack 16. Furthermore, the injector 42 further reduces the pressure of the fuel gas on the upstream side of this injector 42 and discharges the depressurized fuel gas to the downstream side. In other words, in the gas supply path 32, high-pressure fuel gas flows from the high-pressure tank 14 to the regulator 40, mid-pressure fuel gas flows from the regulator 40 to the injector 42, and low-pressure fuel gas flows from the injector 42 to the fuel cell stack 16.

The ejector 44, while sucking in fuel off gas from the gas circulation path 36 due to the negative pressure generated by the movement of the fuel gas discharged from the injector 42, supplies this fuel gas to the fuel cell stack 16 on the downstream side.

Furthermore, a bypass supply path 46, which bypasses the injector 42 and the ejector 44, is connected to the gas supply path 32. This bypass supply path 46 is provided with a BP (bypass) injector 48. When high-current power generation by the fuel cell stack 16 is requested, for example, the BP injector 48 increases the discharge amount of the fuel gas up to the request value for the high-current power generation by opening and closing a valve thereof under the control of the gas control ECU 22.

On the other hand, a gas-liquid separator 50 is provided at a boundary portion between the gas discharge path 34 and the gas circulation path 36. The gas-liquid separator 50 separates the liquid (water created during power generation) contained in the fuel off gas from the gas (hydrogen gas, nitrogen gas, and the like). The gas circulation path 36 is connected to the top portion of the gas-liquid separator 50, and causes the fuel off gas from which the liquid has been separated by the gas-liquid separator 50 to flow out. The gas circulation path 36 is provided with a pump 52 that causes the fuel off gas to circulate back to the gas supply path 32.

Furthermore, one end of a drain path 54 for discharging the separated liquid is connected to the bottom portion of the gas-liquid separator 50. The drain path 54 is provided with a drain valve 54a that discharges and cuts off the discharge of the liquid. The other end of the drain path 54 is connected to the purge path 38.

The sensor group 20 of the gas supply system 10 includes a plurality of pressure sensors 60 (high-pressure sensor 62 and mid-pressure sensor 64) that detect the pressure of the fuel gas. Although not shown in the drawings, the sensor group 20 may include a temperature sensor, a flow rate sensor, and the like in addition to the pressure sensors 60.

The high-pressure sensor 62 is a first pressure sensor provided in the gas supply path 32 between the high-pressure tank 14 and the regulator 40. In other words, the high-pressure sensor 62 is configured to be capable of detecting the pressure of the high-pressure fuel gas on the upstream side of the regulator 40. The high-pressure sensor 62 is connected to the gas control ECU 22, and outputs the detected pressure (first detection information I1) to the gas control ECU 22. The high-pressure sensor 62 may be provided inside the container body 26 of the high-pressure tank 14.

The mid-pressure sensor 64 is a second pressure sensor provided between the regulator 40 and the injector 42 (on the upstream side of the location where the bypass supply path 46 is connected). In other words, the mid-pressure sensor 64 is configured to be capable of detecting the pressure of the mid-pressure fuel gas that has been depressurized by the regulator 40. The mid-pressure sensor 64 is also connected to the gas control ECU 22, and outputs the detected pressure (second detection information I2) to the gas control ECU 22.

Figure 2:
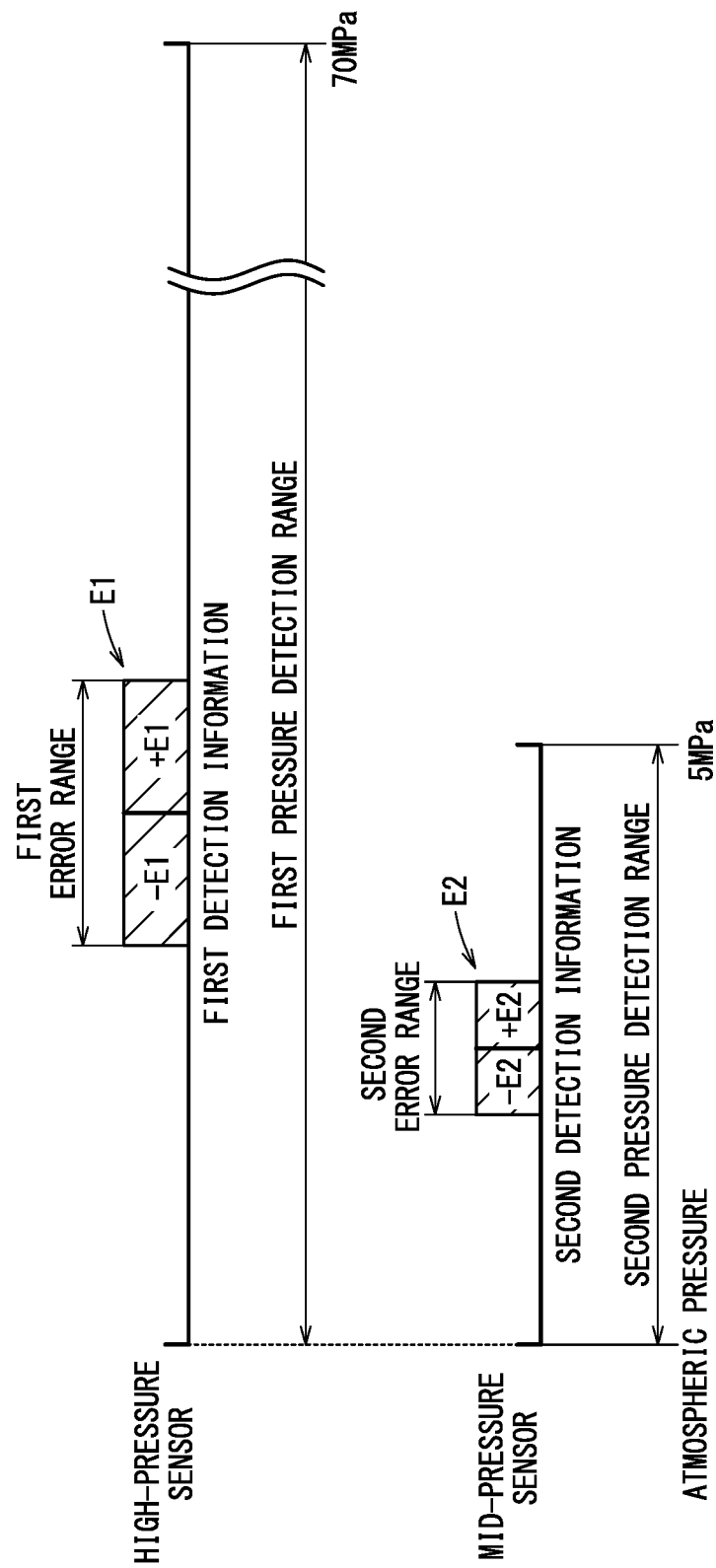
FIG. 2 is a descriptive diagram showing pressure detection ranges and error ranges of a high-pressure sensor and a mid-pressure sensor.

Here, as shown in FIG. 2, the high-pressure sensor 62 includes a wide first pressure detection range for detecting the high-pressure fuel gas, while the mid-pressure sensor 64 has a second pressure detection range, which is narrower than that of the high-pressure sensor 62, for detecting the mid-pressure fuel gas. Although it depends on the pressure resistance capabilities of the high-pressure tank 14, the first pressure detection range of the high-pressure sensor 62 is set in an approximate range from atmospheric pressure to 70 MPa, for example. Although it depends on the depressurization capability of the regulator 40, the second pressure detection range of the mid-pressure sensor 64 is set in an approximate range from atmospheric pressure to 5 MPa, for example.

When the pressure of the fuel gas inside the high-pressure tank 14 is less than or equal to a prescribed tank protection pressure GP (see FIGS. 4A to 4C), there is a higher possibility of the high-pressure tank 14 being damaged, for example. Furthermore, due to the valve of the regulator 40 not opening at the prescribed tank protection pressure GP, it becomes impossible for the mid-pressure sensor 64 to determine the lack of gas.

Since the high-pressure sensor 62 and the mid-pressure sensor 64 differ from each other with respect to the pressure detection ranges as described above, the error ranges occurring in the pressure detection also differ. That is, the high-pressure sensor 62 detects pressure with a first error range E1 that is relatively wide. The first error range E1 has a positive component of +E1 and a negative component of −E1.

On the other hand, the mid-pressure sensor 64 detects pressure with a second error range E2, which is narrower than the first error range E1. That is, the second error range E2 has a positive component (+E2) that is smaller than +E1 and a negative component (−E2) that is smaller than −E1. It should be noted that, in the normal state where a sufficient amount of fuel gas is stored in the high-pressure tank 14, the pressure adjustment range PR of the regulator 40 is the first pressure adjustment range PR1, as described above. Therefore, in the normal state, the mid-pressure sensor 64 detects the pressure of the fuel gas on the downstream side of the regulator 40 with an error range obtained by adding the first pressure adjustment range PR1 to the second error range E2.

Returning to FIG. 1, the gas control ECU 22 is formed by a computer including a processor 66, a memory 68, and an input/output interface 70, and is connected in a communicable manner to each device of the gas supply system 10, the sensor group 20, and a notifying section 72. The notifying section 72 is a device that notifies a user of the gas supply system 10 about the state of the fuel gas in the high-pressure tank 14, and may be an indicator, monitor, or speaker provided in the fuel cell vehicle, for example.

Figure 3:
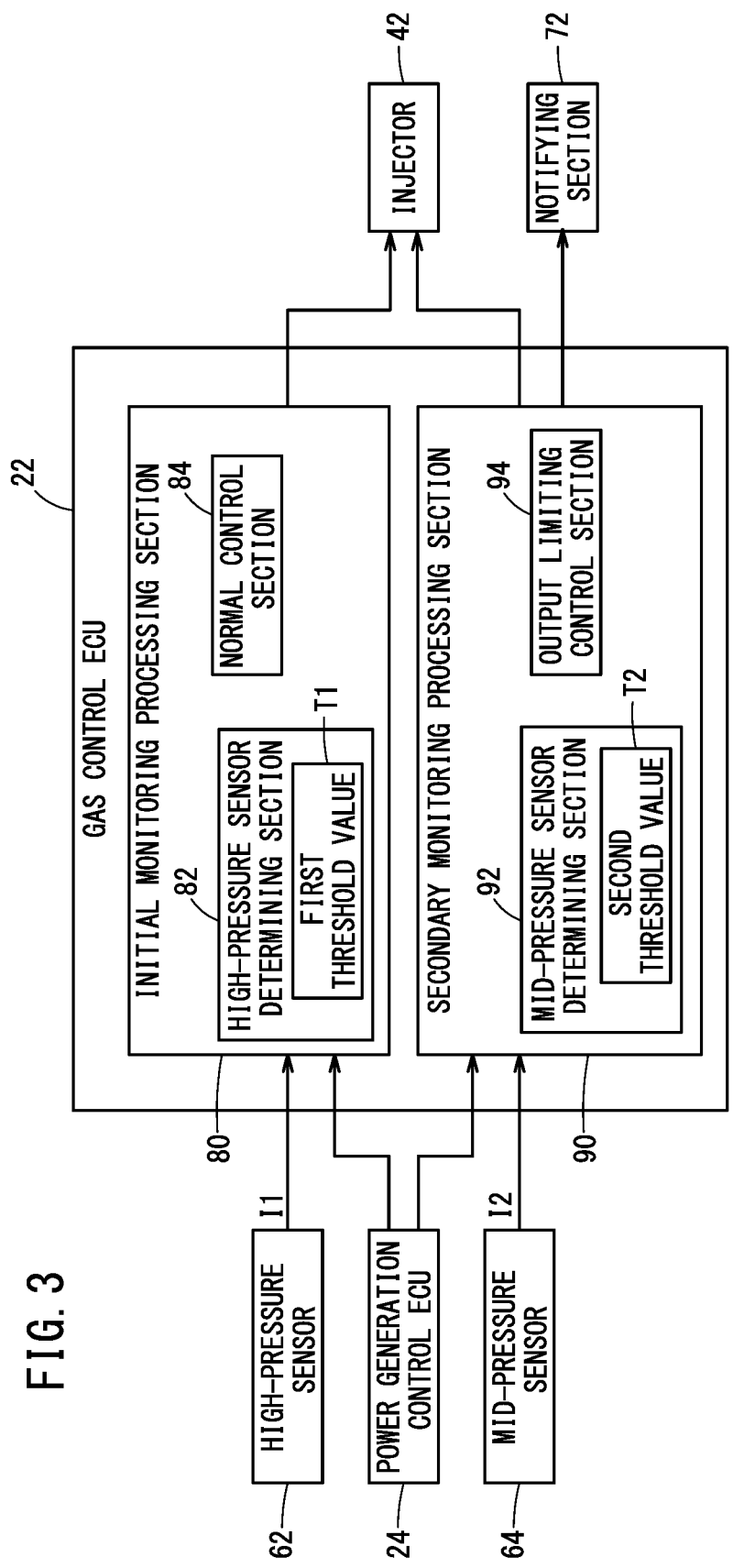
FIG. 3 is a block diagram showing functions of a gas control ECU.

The gas control ECU 22 creates function blocks for controlling the flow state of the fuel gas, as shown in FIG. 3, by having the processor 66 execute a program (not shown in the drawings) stored in the memory 68. Furthermore, when the fuel gas is being supplied, the gas control ECU 22 performs the determination concerning lack of gas inside the high-pressure tank 14 in two stages, respectively using the detection signal of the high-pressure sensor 62 (first detection information I1) and the detection signal of the mid-pressure sensor 64 (second detection information I2). For this purpose, an initial monitoring processing section 80 and a secondary monitoring processing section 90 are created in the gas control ECU 22.

The initial monitoring processing section 80 is a function section that operates when there is enough fuel gas remaining in the high-pressure tank 14 and the pressure of the high-pressure tank 14 is high. A high-pressure sensor determining section 82 and a normal control section 84 are provided in this initial monitoring processing section 80.

During normal control (operation of the normal control section 84), the high-pressure sensor determining section 82 receives the first detection information I1 of the high-pressure sensor 62 and performs an initial monitoring step of determining the remaining amount of fuel gas in the high-pressure tank 14. Therefore, the high-pressure sensor determining section 82 holds in advance a first threshold value T1 to be compared to the first detection information I1. The first threshold value T1 is preferably set to be as low as possible based on the protection pressure of the high-pressure tank 14, the first error range E1 of the high-pressure sensor 62, and the like. For example, as shown in FIG. 4A, the first threshold value T1 may be set to a value obtained by adding together the tank protection pressure GP of the high-pressure tank 14 and the absolute value of the negative component (−E1) of the first error range E1 of the high-pressure sensor 62.

During normal power generation by the fuel cell stack 16, the normal control section 84 calculates a supply amount of the fuel gas based on the request command of the power generation control ECU 24, and controls each device to supply the fuel gas of the high-pressure tank 14 to the fuel cell stack 16. For example, the normal control section 84 adjusts the fuel gas supply amount by opening the main stop valve 30 and repeatedly opening and closing the valve of the injector 42 according to a duty ratio corresponding to the calculated supply amount.

The secondary monitoring processing section 90 operates after it has been determined in the initial monitoring step that the first detection information I1 of the high-pressure sensor 62 is less than or equal to the first threshold value T1. A mid-pressure sensor determining section 92 and an output limiting control section 94 are provided in this secondary monitoring processing section 90.

During output limiting control (operation of the output limiting control section 94), the mid-pressure sensor determining section 92 receives the second detection information I2 of the mid-pressure sensor 64 and performs a secondary monitoring step of determining the remaining amount of fuel gas in the high-pressure tank 14. That is, after the initial monitoring step, the gas supply system 10 uses the second detection information I2 having the second error range E2 that is narrower than the first error range E1, thereby increasing the accuracy of the determination concerning the remaining amount of gas (lack of gas) in the high-pressure tank 14.

Therefore, the mid-pressure sensor determining section 92 holds in advance a second threshold value T2 to be compared to the second detection information I2. If the second detection information I2 is less than or equal to the second threshold value T2, the secondary monitoring processing section 90 confirms that there is a lack of fuel gas in the high-pressure tank 14 and notifies the user of this fact via the notifying section 72.

The second threshold value T2 is preferably set as low as possible, based on the protection pressure of the high-pressure tank 14, the second error range E2 of the mid-pressure sensor 64, and the like. For example, as shown in FIG. 4B, the second threshold value T2 may be set to a value obtained by adding together the tank protection pressure GP of the high-pressure tank 14 and the absolute value of the negative component (−E2) of the second error range E2 of the mid-pressure sensor 64.

The following describes the relationship between the second threshold value T2, the second error range E2 of the mid-pressure sensor 64, the pressure adjustment range PR of the regulator 40, and the protection pressure of the high-pressure tank 14 of the gas supply system 10 according to the present embodiment in greater detail.

In the gas supply system 10, if the pressure adjustment range PR, which is the depressurization capability of the regulator 40, is low (close to the protection pressure of the high-pressure tank 14), it is possible to reduce the pressure resistance capabilities of the pipes, devices, and the like on the downstream side of the regulator 40. By decreasing the pressure resistance capabilities of these pipes and devices, it is possible to further promote a reduction in the weight and cost of the gas supply system 10.

Therefore, as shown in FIG. 4A, the gas supply system 10 implements the normal control in the initial monitoring step and, with this normal control, adjusts the flow state of the fuel gas such that the pressure adjustment range PR of the regulator 40 overlaps the second threshold value T2 of the secondary monitoring step. For example, the regulator 40 depressurizes the fuel gas to be in the first pressure adjustment range PR1. Due to this, with the gas supply system 10, it is possible to reduce the pressure resistance capabilities of the pipes, devices, and the like on the downstream side of the regulator 40.

Here, FIG. 4C is referenced to consider a case occurring if the first pressure adjustment range PR1 set in the normal control (initial monitoring step) overlaps the second threshold value T2 in the secondary monitoring step as well. In this case, the mid-pressure sensor 64 detects second detection information I2′ in which the first pressure adjustment range PR1 of the regulator 40 is added to the second error range E2 (±E2). Here, even though the actual pressure is within the first pressure adjustment range PR1 or greater than the first pressure adjustment range PR1, there is a possibility of this pressure being detected as less than or equal to the second threshold value T2 due to the detection error, which would lead to a determination that there is a lack of gas in this case. In other words, even though the mid-pressure sensor 64 having a smaller error range than the high-pressure sensor 62 is used, the accuracy of the determination concerning the lack of gas in the high-pressure tank 14 is reduced.

Therefore, in the secondary monitoring step, the gas control ECU 22 according to the present embodiment offsets the pressure adjustment range PR of the regulator 40 from the second threshold value T2 including the positive component (+E2) of the second error range E2, as shown in FIG. 4B. Specifically, the output limiting control section 94 of the secondary monitoring processing section 90 implements output limiting control of the fuel gas, to change the pressure adjustment range PR of the regulator 40. In this way, the pressure adjustment range PR becomes a second pressure adjustment range PR2 that has a lower limit value L2 and is narrowed, from the first pressure adjustment range PR1 used in the initial monitoring step, by the positive component (+E2) of the second error range E2, with the second threshold value T2 as a reference. An upper limit value H2 of the second pressure adjustment range PR2 is the same as the upper limit value H1 of the first pressure adjustment range PR1.

Figure 5A:
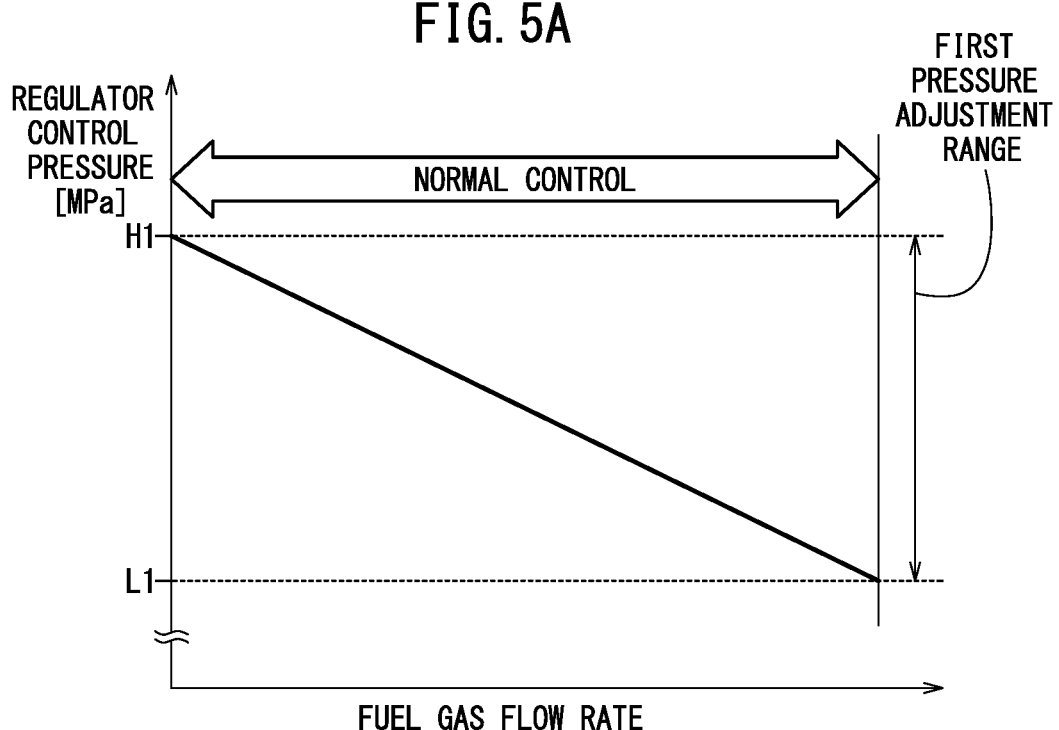
FIG. 5A is a graph showing the flow rate of fuel gas and the pressure adjustment range of a regulator in the normal control.

As an example, FIG. 5A shows the relationship between the flow rate of the fuel gas output to the fuel cell stack 16 and the control pressure (pressure adjustment range PR) of the regulator 40, in the normal control (initial monitoring step). As understood from the drawing, in the gas supply path 32 on the downstream side of the regulator 40, the control pressure of the regulator 40 decreases linearly as the flow rate of the fuel gas becomes greater.

Figure 5B:
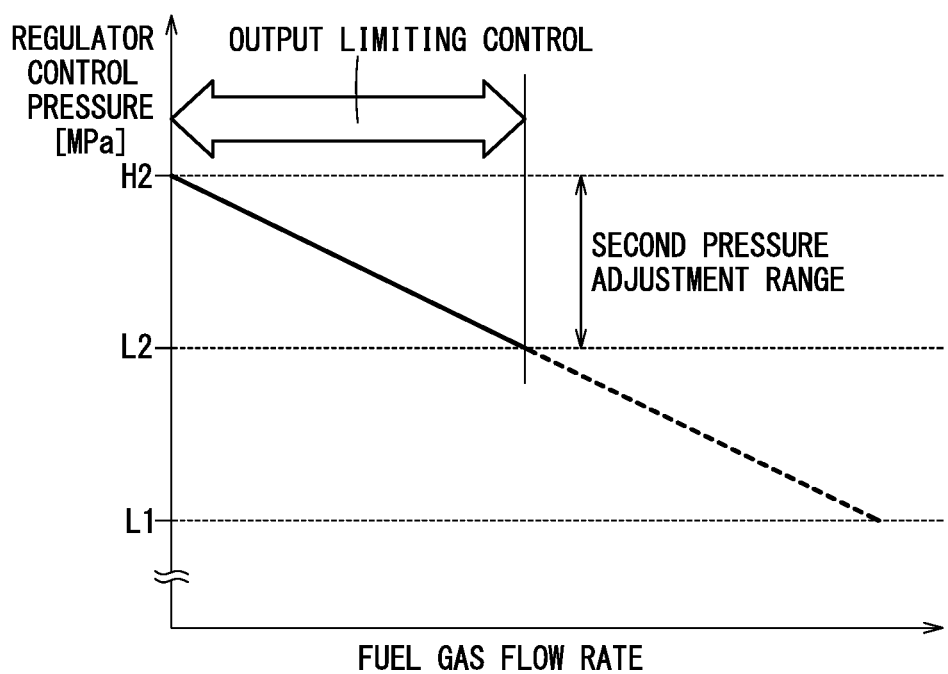
FIG. 5B is a graph showing the flow rate of the fuel gas and the pressure adjustment range of the regulator in the output limiting control.

Accordingly, if the flow rate of the fuel gas output to the fuel cell stack 16 is decreased, the lower limit value of the control pressure of the regulator 40 increases, as shown in FIG. 5B. Therefore, in the output limiting control, the output limiting control section 94 suitably adjusts the opening and closing of the valve of the injector 42 on the downstream side of the regulator 40. In this way, the gas supply system 10 can limit the fuel gas being output to the fuel cell stack 16. Due to this output limiting control, the second pressure adjustment range PR2 of the regulator 40 has the lower limit value L2 that is higher than the lower limit value L1 of the first pressure adjustment range PR1, and this second pressure adjustment range PR2 is offset relative to the second error range E2 defined with the second threshold value T2 as a reference.

The fuel gas output limiting control is not limited to adjusting the operation of opening and closing of the valve of the injector 42 as described above, and can employ various methods. For example, the output limiting control section 94 may implement this output limiting control by limiting the power generation current output from the fuel cell stack 16. By limiting the power generation current via a current adjusting section 74 (see FIG. 1) connected to the fuel cell stack 16, the gas control ECU 22 can restrict the consumption amount of the fuel gas consumed by the fuel cell stack 16. Due to this, the flow rate of the flow gas supplied to the fuel cell stack 16 decreases, resulting in the pressure adjustment range of the regulator 40 for the fuel gas being narrowed. Specifically, the current adjusting section 74 can act as a flow state adjusting section that adjusts the flow rate of the fuel gas in the present invention. Alternatively, by adjusting the circulation velocity of the fuel off gas with the pump 52, the output limiting control section 94 may reduce the flow rate of the fuel gas on the downstream side of the regulator 40 to narrow the pressure adjustment range of the regulator 40.

The gas supply system 10 according to the present embodiment is basically configured as described above, and the following describes the operation thereof.

The power generation control ECU 24 of the fuel cell system 12 causes the gas supply system 10 to operate, to supply the fuel gas from the high-pressure tank 14 to the fuel cell stack 16. The fuel cell stack 16 performs power generation by the electrochemical reaction between the fuel gas and the oxygen-containing gas. For the supply of the fuel gas, the gas control ECU 22 sets a flow state (flow rate, flow velocity, and the like) of the fuel gas based on the detection signal of the sensor group 20. The gas control ECU 22 then suitably controls the operation of the main stop valve 30, the purge valve 38a, the injector 42, the BP injector 48, the pump 52, and the drain valve 54a based on the set flow state of the fuel gas.

Figure 6:
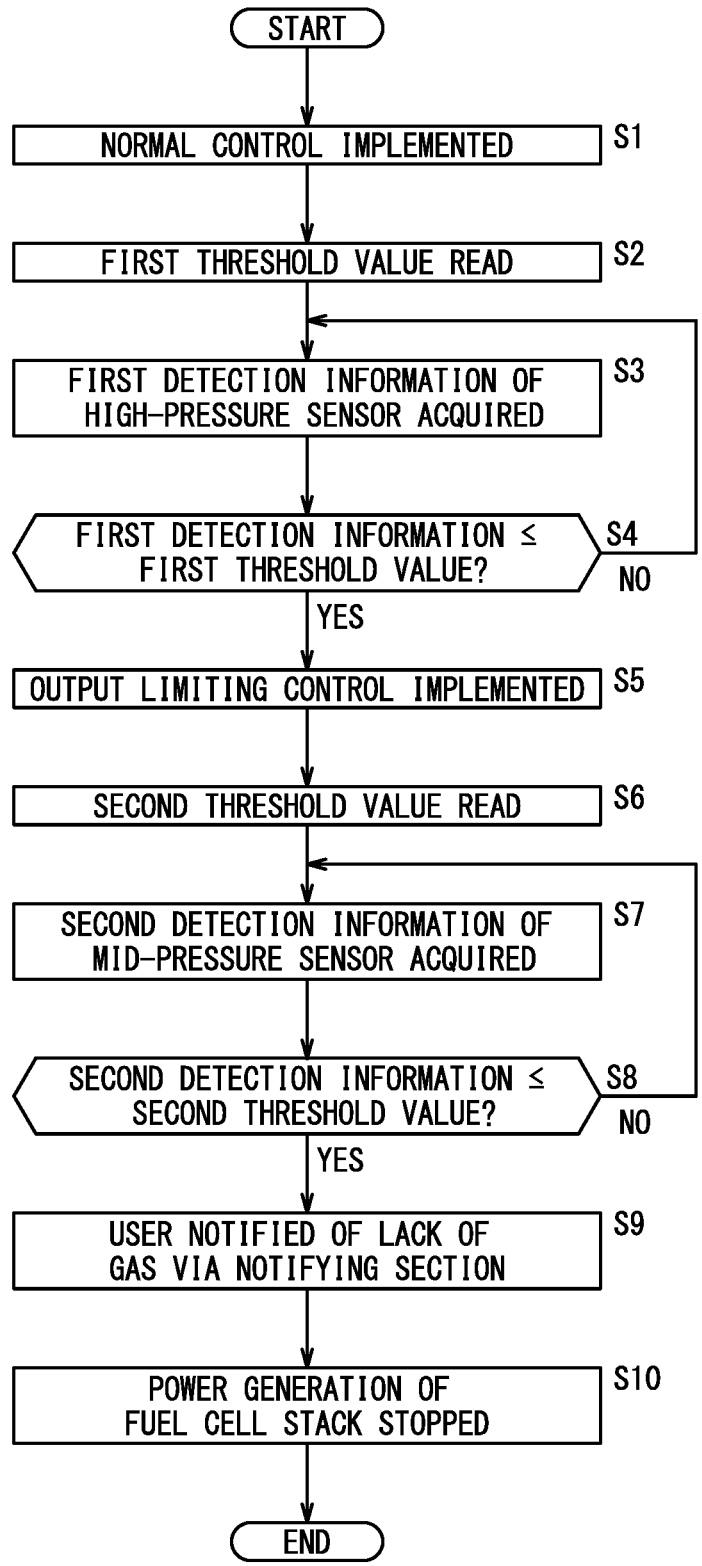
FIG. 6 is a flow chart showing an example of a processing flow of a lack-of-gas determination method of the gas supply system.

Furthermore, while the fuel gas is being supplied, the gas control ECU 22 monitors the remaining amount of fuel gas in the high-pressure tank 14 based on the first detection information I1 of the high-pressure sensor 62 and the second detection information I2 of the mid-pressure sensor 64. Specifically, the gas control ECU 22 implements a processing flow of the lack-of-gas determination method shown in FIG. 6.

In the lack-of-gas determination method, the gas control ECU 22 first implements the initial monitoring step. At this time, the gas control ECU 22 implements the normal control that includes setting the main stop valve 30 to an open state and repeatedly opening and closing the valve of the injector 42 according to a duty ratio corresponding to a target supply amount of the fuel gas (step S1). In the normal control, the regulator 40 reduces the pressure of the fuel gas on the upstream side to be in the first pressure adjustment range PR1, and outputs this depressurized fuel gas to the downstream side (see FIGS. 4A and 5A). Due to this, the pressure in the gas supply path 32 from the regulator 40 to the injector 42 becomes mid-pressure, and the pressure in the gas supply path 32 from the injector 42 to the fuel cell stack 16 becomes low-pressure.

Furthermore, in the normal control, in order to monitor the first detection information I1 of the high-pressure sensor 62, the gas control ECU 22 reads the first threshold value T1 stored in advance in the memory 68 (step S2). On the other hand, the second threshold value T2 that is stored in advance in the memory 68 is within the first pressure adjustment range PR1 of the regulator 40, as shown in FIG. 4A, but is not used in the normal control.

Then, in the initial monitoring step, the gas control ECU 22 acquires the fuel gas pressure (first detection information I1) on the high-pressure tank 14 side detected by the high-pressure sensor 62 (step S3), and determines whether this first detection information I1 is less than or equal to the first threshold value T1 (step S4). If the first detection information I1 exceeds the first threshold value T1 (step S4: NO), the process returns to step S3 and similar processing is then repeated. On the other hand, if the first detection information I1 is less than or equal to the first threshold value T1 (step S4; YES), the process moves to step S5.

At step S5, the gas control ECU 22 switches from the normal control to the output limiting control. In the output limiting control, the gas control ECU 22 limits the flow rate of the fuel gas supplied (output) to the fuel cell stack 16 from the gas flow portion 18, to change the pressure adjustment range PR of the regulator 40 to the second pressure adjustment range PR2 (see FIGS. 4B and 5B). For example, the gas control ECU 22 limits the discharge amount (flow rate) of the fuel gas by the injector 42.

Furthermore, in the output limiting control, the gas control ECU 22 switches from the initial monitoring step (monitoring of the detection signal of the high-pressure sensor 62) to the secondary monitoring step (monitoring of the detection signal of the mid-pressure sensor 64). Therefore, the gas control ECU 22 reads, from the memory 68, the second threshold value T2 instead of the first threshold value T1 that has been used (step S6).

Then, in the secondary monitoring step, the gas control ECU 22 acquires the fuel gas pressure (second detection information I2) of the high-pressure tank 14 detected by the mid-pressure sensor 64 (step S7), and determines whether this second detection information I2 is less than or equal to the second threshold value T2 (step S8). At this time, the pressure adjustment range PR of the regulator 40 is changed to the second pressure adjustment range PR2 according to the output limiting control. The lower limit value L2 of this second pressure adjustment range PR2 does not overlap the second threshold value T2, and is higher than the second threshold value T2 by the positive component (+E2) of the second error range E2.

Accordingly, in a case where the fuel gas pressure has dropped to near the second threshold value T2, even if the mid-pressure sensor 64 were to detect the second detection information I2 including the second error range E2, the second detection information I2 would not be a value having the second pressure adjustment range PR2 of the regulator 40 added thereto. In other words, the mid-pressure sensor 64 can accurately detect the reduced fuel gas pressure near the second threshold value T2. By comparing this second detection information I2 detected by the mid-pressure sensor 64 to the second threshold value T2, the gas control ECU 22 can correctly recognize a lack of gas in the high-pressure tank 14.

If the second detection information I2 exceeds the second threshold value T2 (step S8: NO), the gas control ECU 22 returns to step S7 and then repeats similar processing. On the other hand, if the second detection information I2 is less than or equal to the second threshold value T2 (step S8: YES), the gas control ECU 22 recognizes the lack of fuel gas in the high-pressure tank 14 and moves to step S9. At step S9, the gas control ECU 22 notifies the user of the fuel cell system 12 that there is a lack of gas, via the notifying section 72.

Furthermore, in response to receiving the lack-of-gas determination result of the gas control ECU 22, the power generation control ECU 24 performs a process of stopping the power generation of the fuel cell stack 16 (step S10). At this time, the gas control ECU 22 stops the supply of fuel gas to the fuel cell stack 16 by, for example, closing the main stop valve 30, or stopping the operation of each device (injector 42, pump 52, and the like) of the gas flow portion 18. Due to this, it is possible to protect the high-pressure tank 14 while favorably using up all of the fuel gas of the high-pressure tank 14, according to the determination of the lack of gas in the high-pressure tank 14.

The following describes the pressure change of the fuel gas in the high-pressure tank 14 over time and the control performed up to the lack-of-gas determination, while referencing FIG. 7. After the release of fuel gas from the high-pressure tank 14 has started, the pressure of the fuel gas in the high-pressure tank 14 is monitored based on the first detection information I1 of the high-pressure sensor 62 (initial monitoring step). At this time, the gas control ECU 22 implements the normal control and causes each device to operate based on the power generation request of the power generation control ECU 24. Due to this, the regulator 40 reduces the pressure of the fuel gas on the downstream side to be in the first pressure adjustment range PR1. The pressure of the fuel gas in the high-pressure tank 14 (first detection information I1) gradually decreases until the timing t1 when the first threshold value T1 is reached.

At the timing t1 when the fuel gas pressure becomes less than or equal to the first threshold value T1, the pressure of the fuel gas in the high-pressure tank 14 is monitored using the second detection information I2 of the mid-pressure sensor 64 instead of the first detection information I1 of the high-pressure sensor 62 (secondary monitoring step). Furthermore, the gas control ECU 22 transitions from the normal control to the output limiting control, and limits the flow rate of the fuel gas output to the fuel cell stack 16. Due to this, the regulator 40 reduces the pressure of the fuel gas on the downstream side to be in the second pressure adjustment range PR2, and the pressure of the fuel gas in the high-pressure tank 14 decreases more slowly than during the normal control.

If the pressure of the fuel gas in the high-pressure tank 14 is above the second pressure adjustment range PR2 at the timing t1 or later, the mid-pressure sensor 64 detects the approximate median value of the second pressure adjustment range PR2 of the regulator 40, as the second detection information I2. At the timing t2 when the pressure of the fuel gas in the high-pressure tank 14 becomes less than or equal to the median value of the second pressure adjustment range PR2, the pressure of the fuel gas in the high-pressure tank 14 matches the second detection information I2 of the mid-pressure sensor 64. Accordingly, the second detection information I2 reflects the pressure of the fuel gas in the high-pressure tank 14 in real time, from the timing t2 onward.

According to the output limiting control, the gas control ECU 22 offsets the second pressure adjustment range PR2 of the regulator 40 from a value obtained by adding the positive component (+E2: see FIG. 4B) of the second error range E2 to the second threshold value T2. Therefore, at a timing when the pressure of the fuel gas in the high-pressure tank 14 becomes close to the second threshold value T2, the mid-pressure sensor 64 can detect the second detection information I2 (including the second error range E2) that does not have the second pressure adjustment range PR2 of the regulator 40 added thereto. As a result, the gas control ECU 22 can accurately monitor whether the pressure of the fuel gas in the high-pressure tank 14 (second detection information I2) has become less than or equal to the second threshold value T2.

At the timing t3 when the second detection information I2 reaches the second threshold value T2, the gas control ECU 22 determines that there is a lack of fuel gas in the high-pressure tank 14. In accordance with this lack-of-gas determination, the power generation control ECU 24 stops the power generation of the fuel cell stack 16. At this time, the gas control ECU 22 stops the release of the fuel gas from the high-pressure tank 14 by stopping the operation of each device. Accordingly, from the timing t3 onward, the mid-pressure sensor 64 detects fuel gas pressure that has levelled off.

The present invention is not limited to the above-described embodiments, and various alternative or additional configurations could be adopted therein without departing from the scope of the present invention. For example, the gas supply system 10 is not limited to being adopted in the fuel cell system 12, and can be adopted in various systems that supply gas from the high-pressure tank 14 to an object that consumes gas.

As another example, the gas supply system 10 may be configured to include a plurality of high-pressure tanks 14, in which case the gas supply paths 32 extending from the connectors 28 of the respective high-pressure tanks 14 should merge on the upstream side of the location where the high-pressure sensor 62 is installed.

The following is a record of the technical concepts and effects that can be understood from the above embodiments.

One aspect of the present invention is a gas supply system 10 comprising a high-pressure tank 14; a regulator 40 that reduces pressure of a gas (fuel gas) released from the high-pressure tank 14 to be within a pressure adjustment range PR and causes the gas to flow to a downstream side; a first pressure sensor (high-pressure sensor 62) that has a first error range E1 and detects the pressure of the gas on an upstream side of the regulator 40; a second pressure sensor (mid-pressure sensor 64) that has a second error range E2 narrower than the first error range E1 and detects the pressure of the gas on the downstream side of the regulator 40; a control section (gas control ECU 22) that processes first detection information I1 of the first pressure sensor and second detection information I2 of the second pressure sensor; and a flow state adjusting section (injector 42, current adjusting section 74) that changes the pressure adjustment range PR by adjusting a flow state of the gas under the control of the control section, wherein the control section has a first threshold value T1 corresponding to the first detection information I1 and a second threshold value T2 corresponding to the second detection information I2, in order to determine lack of gas in the high-pressure tank 14, and the control section compares the first detection information I1 to the first threshold value T1, causes the pressure adjustment range PR to overlap the second error range E2 defined with the second threshold value T2 as a reference point if the first detection information I1 exceeds the first threshold value T1, and offsets the pressure adjustment range PR relative to the second error range E2 defined with the second threshold value T2 as the reference point if the first detection information I1 is less than or equal to the first threshold value T1.

The gas supply system 10 described above can sufficiently depressurize the gas with the regulator 40, by causing the pressure adjustment range PR of the regulator 40 to overlap the second threshold value T2 in a state where the first detection information I1 exceeds the first threshold value T1. Accordingly, with the gas supply system 10, it is possible to reduce the pressure resistance capabilities of the devices on the downstream side of the regulator 40 as much as possible, thereby promoting a reduction in weight and cost. Furthermore, in a state where the first detection information I1 is less than or equal to the first threshold value T1, the control section (gas control ECU 22) offsets the pressure adjustment range PR relative to the second error range E2 defined with the second threshold value T2 as a reference point, and thus can obtain the second detection information I2 in which the effect of the pressure adjustment range PR is restricted. Accordingly, it is possible for the control section to accurately compare the second detection information I2 to the second threshold value T2, to accurately determine the lack of gas in the high-pressure tank 14.

Furthermore, after the first detection information I1 has become less than or equal to the first threshold value T1, the control section (gas control ECU 22) compares the second detection information I2 to the second threshold value T2, and determines that there is a lack of gas in the high-pressure tank 14 if the second detection information I2 is less than or equal to the second threshold value T2. Due to this, after the first detection information I1 is compared to the first threshold value T1 and the first detection information I1 is determined to be less than or equal to the first threshold value T1, the gas supply system 10 can accurately determine the lack of gas in the high-pressure tank 14 based on the second detection information I2 that has the narrow second error range E2. As a result, the gas supply system 10 can use up enough of the gas in the high-pressure tank 14.

Furthermore, if the second detection information I2 becomes less than or equal to the second threshold value T2, the control section (gas control ECU 22) stops the release of the gas from the high-pressure tank 14. Due to this, when it has been determined that there is a lack of gas in the high-pressure tank 14, the gas supply system 10 can immediately stop the release of the gas to protect the high-pressure tank 14.

Furthermore, if the second detection information I2 becomes less than or equal to the second threshold value T2, the control section (gas control ECU 22) provides notification of the lack of gas in the high-pressure tank 14 via a notifying section 72. Due to this, the gas supply system 10 can quickly notify the user of the gas supply system 10 about the lack of gas in the high-pressure tank 14, and therefore it is possible for the user to adopt suitable countermeasures such as filling the high-pressure tank 14 with gas.

Furthermore, the control section (gas control ECU 22) continues to offset the pressure adjustment range PR until the second detection information I2 becomes less than or equal to the second threshold value T2. Due to this, the control section can stably perform the comparison between the second detection information I2 and the second threshold value T2 after the first detection information I1 has become less than or equal to the first threshold value T1.

Furthermore, the control section (gas control ECU 22) changes the pressure adjustment range PR by controlling the flow state adjusting section (injector 42, current adjusting section 74) to adjust the flow rate of the gas output to a gas-consuming object (fuel cell stack 16) that consumes gas. Due to this, the gas supply system 10 can easily change the pressure adjustment range PR of the regulator 40.

Furthermore, the flow state adjusting section is an injector 42 that discharges the gas to the gas-consuming object (fuel cell stack 16) on the downstream side of the regulator 40, and the control section (gas control ECU 22) narrows the pressure adjustment range PR by limiting the flow rate of the gas discharged by the injector 42 if the second detection information I2 becomes less than or equal to the second threshold value T2. By controlling the operation of the injector 42 to limit the flow rate of the gas in this way, the gas supply system 10 can easily narrow the pressure adjustment range PR of the regulator 40.

Furthermore, the control section (gas control ECU 22) causes a lower limit value of the pressure adjustment range PR to match the second threshold value T2 if the first detection information I1 exceeds the first threshold value T1, and offsets a lower limit value L2 of the pressure adjustment range (second pressure adjustment range PR2) relative to the second threshold value T2 by a value greater than or equal to a positive component (+E2) of the second error range E2, if the first detection information I1 is less than or equal to the first threshold value T1. Due to this, the gas supply system 10 can cause the pressure adjustment range PR of the regulator 40 to become closer to the second threshold value T2, thereby increasing the depressurization of the regulator 40 and making it possible to further promote the reduction in weight and cost of the devices on the downstream side of the regulator 40.

What is claimed is:

1. A gas supply system comprising:
a high-pressure tank;
a regulator configured to reduce pressure of a gas released from the high-pressure tank to be within a pressure adjustment range and cause the gas to flow to a downstream side;
an injector configured to reduce pressure of the gas flowing from the regulator and discharge the gas on the downstream side;
a first pressure sensor that has a first error range and is configured to detect the pressure of the gas between the high pressure tank and the regulator;
a second pressure sensor that has a second error range narrower than the first error range and is configured to detect the pressure of the gas between the regulator and the injector; and
a control section configured to process first detection information of the first pressure sensor and second detection information of the second pressure sensor,
the control section compares a first detection information indicating a pressure detected by the first pressure sensor with a first threshold value,
if the first detection information exceeds the first threshold value, the control section controls the injector according to a target supply amount of the gas,
if the first detection information is less than or equal to the first threshold value, the control section controls a flow state of the gas to raise a lower limit value of the pressure adjustment range to be greater than or equal to a lower limit of the second error range defined with the second threshold value as the reference point while keeping an upper limit value of the pressure adjustment range unchanged, and compares a second detection information indicating a pressure detected by the second pressure sensor with a second threshold value, and if the second detection information is less than or equal to the second threshold value, the control section determines a lack of gas in the high-pressure tank.

2. The gas supply system according to claim 1, wherein if the second detection information becomes less than or equal to the second threshold value, the control section stops release of the gas from the high-pressure tank.

3. The gas supply system according to claim 1, wherein if the second detection information becomes less than or equal to the second threshold value, the control section provides notification of the lack of gas in the high-pressure tank via a notifying section.

4. The gas supply system according to claim 1, wherein the control section continues to control the flow state of the gas to raise the lower limit value of the pressure adjustment range to be greater than or equal to an upper limit of the second error range until the second detection information becomes less than or equal to the second threshold value.

5. The gas supply system according to claim 1, wherein the control section changes the pressure adjustment range to adjust a flow rate of the gas output to a gas-consuming object that consumes gas.

6. The gas supply system according to claim 5, wherein: the control section narrows the pressure adjustment range by limiting the flow rate of the gas discharged by the injector, if the second detection information becomes less than or equal to the second threshold value.

7. The gas supply system according to claim 1, wherein the control section causes the lower limit value of the pressure adjustment range to match the second threshold value if the first detection information exceeds the first threshold value, and raises the lower limit value of the pressure adjustment range relative to the second threshold value by a value greater than or equal to a positive component of the second error range, if the first detection information is less than or equal to the first threshold value.

* * * * *